US010392206B1

(12) United States Patent
Gleason et al.

(10) Patent No.: US 10,392,206 B1
(45) Date of Patent: Aug. 27, 2019

(54) LOADING DOCK RAIL SHELTER

(71) Applicants: Denis Gleason, Bowmanville (CA); Andrew Barrett, Ajax (CA)

(72) Inventors: Denis Gleason, Bowmanville (CA); Andrew Barrett, Ajax (CA)

(73) Assignee: Nordock, Inc., Bowmanville/Ontario (CA)

( * ) Notice: Subject to any disclaimer, the term of this patent is extended or adjusted under 35 U.S.C. 154(b) by 0 days.

(21) Appl. No.: 16/155,764

(22) Filed: Oct. 9, 2018

(51) Int. Cl.
| | |
|---|---|
| B65G 9/00 | (2006.01) |
| B65G 69/00 | (2006.01) |
| B65G 69/28 | (2006.01) |
| B64F 1/305 | (2006.01) |

(52) U.S. Cl.
CPC ........ *B65G 69/008* (2013.01); *B65G 69/2811* (2013.01); *B64F 1/305* (2013.01)

(58) Field of Classification Search
CPC .............. B65G 69/008; B65G 69/2876; B65G 69/2811
USPC ................................................ 52/2.12, 173.2
See application file for complete search history.

(56) References Cited

U.S. PATENT DOCUMENTS

| | | | | |
|---|---|---|---|---|
| 2,567,995 A | * | 9/1951 | Eshnaur ............... | B65G 69/008 135/145 |
| 3,528,086 A | | 9/1970 | Conger | |
| 3,816,867 A | * | 6/1974 | Shirzad ................... | B64F 1/305 135/115 |
| 4,318,345 A | | 3/1982 | Kleim | |
| 4,389,821 A | * | 6/1983 | O'Neal ................ | B65G 69/008 52/173.2 |
| 4,495,737 A | * | 1/1985 | Alten .................... | B65G 69/008 14/71.5 |
| 4,750,299 A | * | 6/1988 | Frommelt ............ | B65G 69/008 14/71.5 |
| 5,007,211 A | * | 4/1991 | Ouellet ................ | B65G 69/008 52/173.2 |

(Continued)

FOREIGN PATENT DOCUMENTS

DE          2555201 A1 *  6/1977  ........... B65G 69/008

OTHER PUBLICATIONS

Fairborn Installation Instructions for Series 4500 Inflatable Rail Shelter sold since at least about the 1990s.

(Continued)

*Primary Examiner* — Robert Canfield
(74) *Attorney, Agent, or Firm* — Jeffrey S. Sokol

(57) ABSTRACT

The present invention is a loading dock rail shelter with an inflatable canopy and a dual stabilizing and passive retraction support assembly. The canopy has an outer end that moves between inflated and retracted positions. The support assembly includes a rigid frame secured around the perimeter of the canopy, and a pivoting support mechanism that allows the frame to ride with the canopy while supporting and guiding the canopy. The shelter has a lower panel assembly that close the bottom of the canopy. The lower panel has lateral support rods and a front panel support assembly secured to the frame. The support assembly supports the canopy and its lower panel so they do not drag along the ground. The rigid frame stabilizes and guides the inflating canopy to seal around a railcar doorway. The support assembly and frame swing back to passively retract and hold the canopy against the building.

26 Claims, 12 Drawing Sheets

(56) References Cited

U.S. PATENT DOCUMENTS 5,927,025 A    7/1999    Brockman

OTHER PUBLICATIONS

Perma Tech Installation Instructions for Inflatable Air Rail Shelter sold since at least about the 1990s.
Rite Hite Installation Instructions for RAIL-DOX RDA-803 3-Sided Inflatable Rail Shelter sold since at least about the 1990s.
Rite Hite Installation Instructions for RAIL-DOX RDA-804 4-Sided Inflatable Rail Shelter sold since at least about the 1990s.
Super Seal Manufacturing website printout showing Series R Inflatable Rail Shelter sold since at least about the 1990s.
Super Seal Manufacturing website photograph showing Series R Inflatable Rail Shelter sold since at least about the 1990s.
Nordock website printout showing Boxcar Model IR-650 Inflatable Shelter sold since 2012.
Nordock website photograph showing Boxcar Model IR-650 Inflatable Shelter sold since 2012.

\* cited by examiner

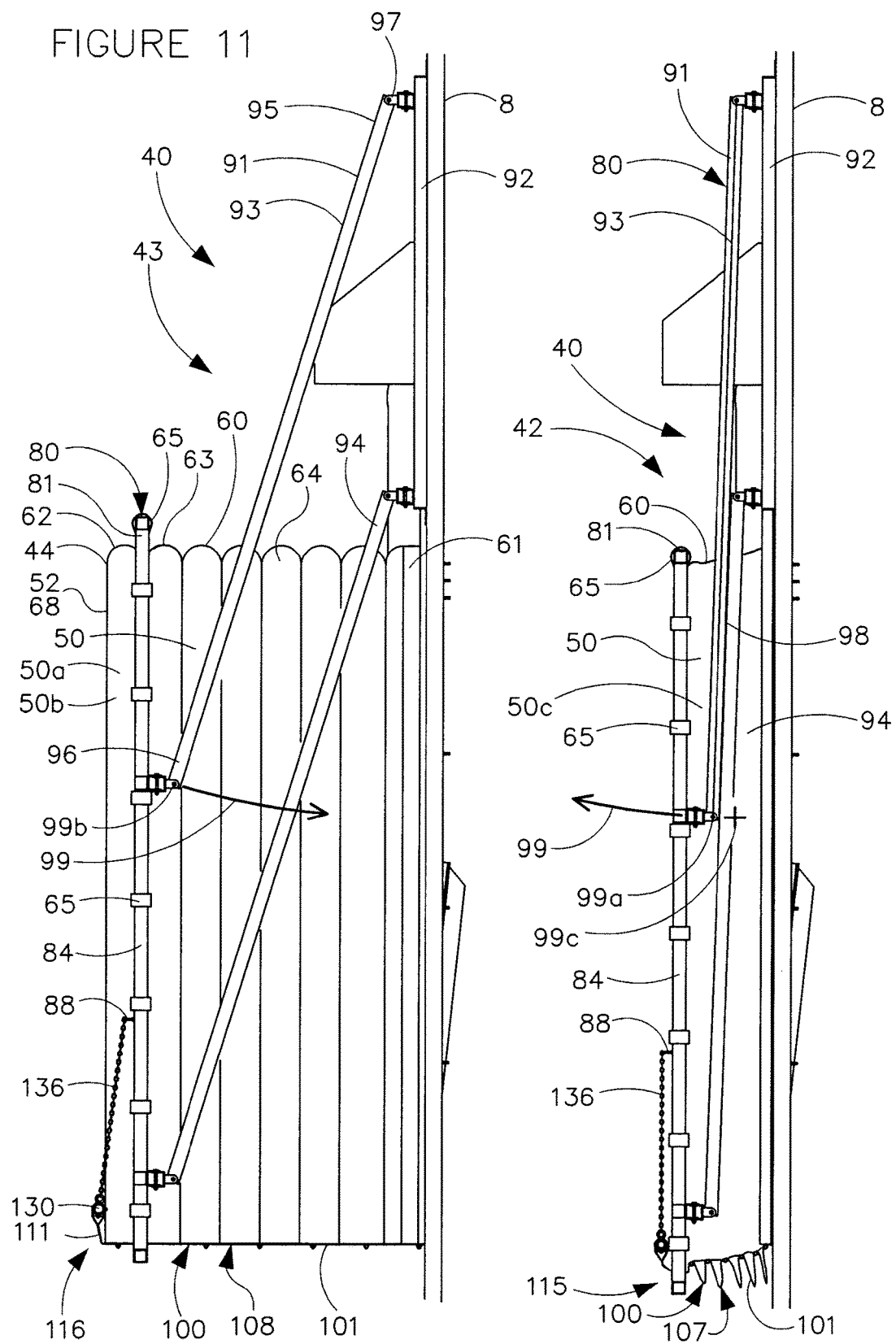

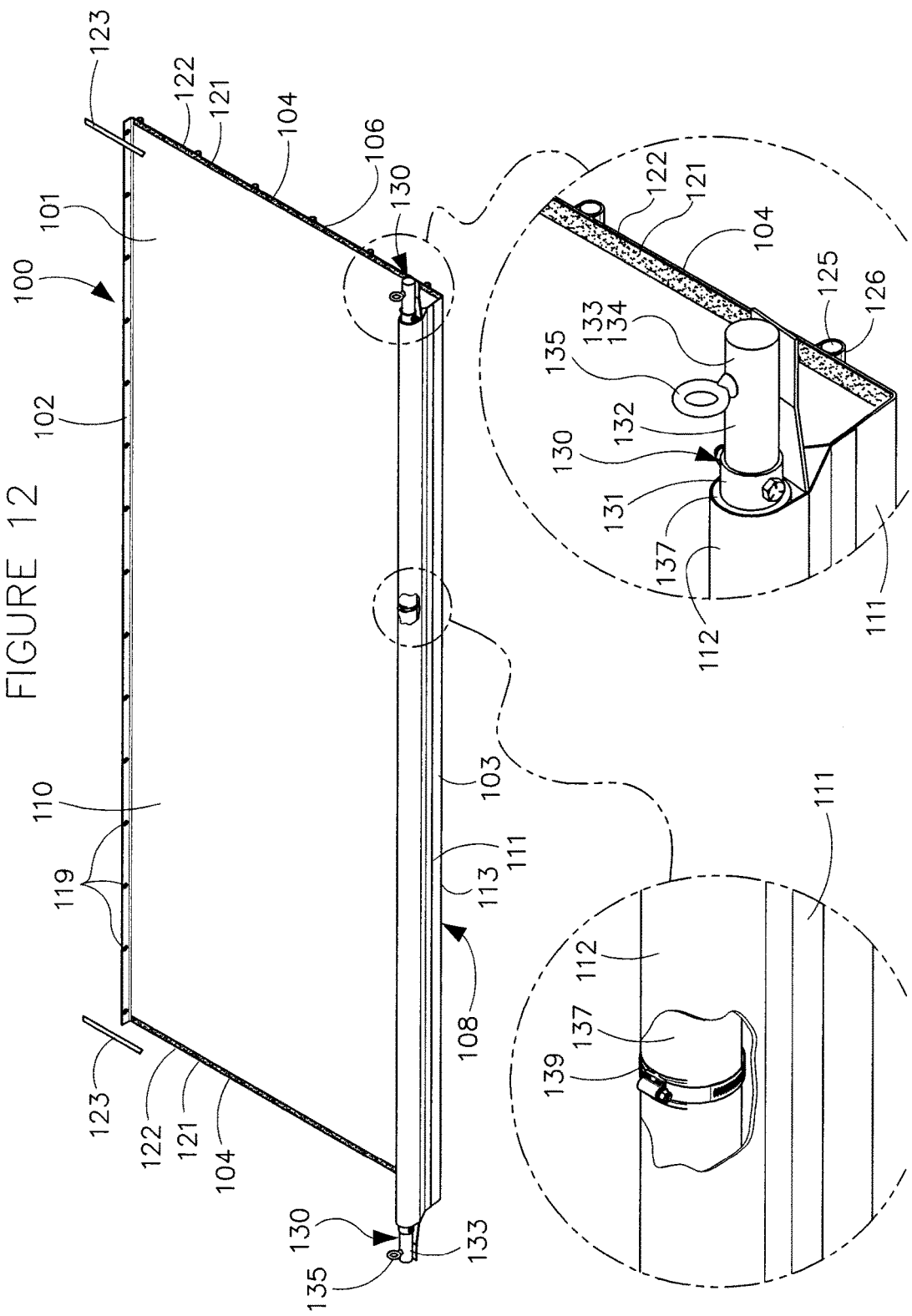

LOADING DOCK RAIL SHELTER

TECHNICAL FIELD OF THE INVENTION

This invention relates to a loading dock rail shelter with an inflating canopy and dual stabilizing and passive retraction support mechanism that keeps the canopy off the ground, guides and stabilizes the canopy to seal around a railcar doorway, and passively retracts to hold the canopy against the loading dock wall and protect it from damage by wind and weather.

BACKGROUND OF THE INVENTION

Loading dock rail shelters form a temporary enclosure between a railroad car and the loading bay of a building. Rail shelters are typically used in conjunction with a dock leveler that forms a bridge between the dock and railcar floors. The shelters prevent rain, snow and ice from accumulating on the floors of the loading bay, railcar, dock leveler and the cargo, and provide a safer environment for loading and unloading operations. Rail shelters can have three or four sides. Three-sided shelters have a top and two side portions that extend over and around the sides of the leveler, and provide a 270 degree seal with the railcar. Large openings remain between the sides of the leveler and the sides of the canopy. Heat, cold, humidity, wind, dust, insects, etc., easily pass through these openings and into the interior of the loading dock, which is of particular concern for refrigerated docks and those handling food products. Four-sided shelters include a bottom portion that extends under the leveler, close the opening along the dock leveler and form a 360 degree seal with the railcar.

Various inflatable rail shelters have been developed and are known in the industry, examples being the Perma Tech 3600 shelter, the Rite-Hite RAIL-DOX shelter, the Fairborn Series 4500 shelter, the Nordock IR-650 shelter and the Super Seal Manufacturing Series R shelter. These rail shelters have a conventional inflatable canopy formed by a series of interconnected air bags. The inner air bag secures to the loading dock wall around the bay opening. When the canopy is inflated by a blower motor, the canopy extends so that its outer air bag seals around the railroad car doorway. Disengaging the blower motor allows the canopy to deflate and retract toward the loading dock building. Elastic bungee cords are often secured to the building to pull the canopy back toward the building wall. A trolley can be cantilevered from the dock wall to support the top of the canopy.

Conventional rail shelters suffer from a variety of problems. One problem is maintaining a required amount of clearance between the deflated shelter and the railcars passing along the railroad tracks. Railroad companies require facilities to be a certain distance from the tracks (i.e., nine feet from the centerline of the tracks) to avoid contacting or interfering with a passing train. When not in use, shelters must comply with this requirement. Bungee cords are commonly used to help retract the inflated canopy and keep it against the building wall. These cords deteriorate, fatigue and break over time, so that they do not effectively hold the entire canopy against the building wall. High winds or gusts of wind can catch a portion of the deflated canopy and blow it toward and into the structure-free zone by the tracks, where it can be struck or snagged by or interfere with a passing train.

Another problem with conventional loading dock rail shelters is that the sides and bottom of the canopy drag along the ground when inflating and deflating. This problem is of particular concern for four-sided canopies with a bottom portion. While inflating and deflating, the floppy canopy hangs down and drags along the ground. The ground along the tracks includes stones, sticks and debris such as broken bottles, crushed cans, boards and nails, etc., that are rough, sharp and jagged, and which can damage the canopy. While bungee cords may reduce the amount of dragging in some situations, they do not eliminate this problem, particularly for four-sided canopies and when the tracks are located further from the building and the canopy must extend a greater distance.

A further problem with conventional loading dock rail shelters is that they do not properly stabilize the canopy when inflated. High winds and gusts of wind can easily push the extended canopy back and forth over rusted, blunt, sharp or jagged components projecting from the surface of a railroad boxcar. Repeated rubbing contact with these surfaces and projections can wear down, tear or otherwise damage the canopy. The blower motor has to constantly run to maintain a proper seal or the damaged canopy has to be replaced. The accumulation of snow or rain on the canopy can also push it down and out of alignment with the railcar doorway, which interferes with boxcar loading and unloading operations.

A still further problem with conventional loading dock rail shelters is they do not properly stabilize the canopy when deflated. Bungee cords have a static or unstretched cord length. This unstretched cord length can be significant in order to allow the canopy to fully extend and seal against a boxcar. The cords provide little or no retraction force when the canopy is close to the dock wall. Individual cords also provide a localized force on separate parts of the canopy. High winds and gusts of wind can catch portions of the floppy deflated canopy and push them back and forth over the rough cinder block surface of the dock wall, building projections, or debris on the ground, which can wear holes in or otherwise damage the canopy.

A still further problem with conventional loading dock rail shelters is maintaining uniform and constant support around the entire perimeter of the shelter. Trollies support the top of the canopy but not the bottom of a four-sided canopy, which is free to hang down and drag along the ground. Bunge cords provide spaced and varying amounts of pullback force. These elastic cords pull excessively on the canopy fabric and hemmed seams when the canopy is fully extended, which can tear the fabric or otherwise damage the canopy. Bungee cords are not typically used on the bottom of a four-sided canopy because cords secured under the canopy pull the bottom and side portions down and into contact with the ground.

A still further problem with conventional loading dock rail shelters is they do not stably accommodate varying railcar configurations. Railcars come in a variety of widths and heights. Wider railcars extend out from the tracks more than narrower railcars. Canopies must extend a greater distance from the building to engage a narrower railcar, and must be able to extend a lesser distance to engage a wider railcar. Taller railcars have taller doorways, and the car floor can be higher above the tracks. Conventional inflatable rail shelters do not provide proper and stable sealing engagement with a variety of different boxcar configurations. For example, the canopy can sag when engaging a wider railcar because it is not fully inflated. Bungee cords can aggravate this problem because the amount of their pullback force varies depending on the width of the boxcar and height of its doorway.

The present invention is intended to solve these and other problems.

BRIEF DESCRIPTION OF THE INVENTION

The present invention pertains to a loading dock rail shelter with an inflatable canopy and a dual stabilizing and passive retraction support assembly. The canopy has an outer end that moves between inflated and retracted positions. The support assembly includes a rigid frame secured around the perimeter of the canopy, and a pivoting support mechanism that allows the frame to ride with the canopy while supporting and guiding the canopy. The shelter has a lower panel assembly that close the bottom of the canopy. The lower panel has lateral support rods and a front panel support assembly secured to the frame. The support assembly supports the canopy and its lower panel so they do not drag along the ground. The rigid frame stabilizes and guides the inflating canopy to seal around a railcar doorway. The support assembly and frame swing back to passively retract and hold the canopy against the building.

The rail shelter support assembly reliably holds the deflated canopy against the building wall to maintain the required setback from the railroad tracks. The rigid frame extends around the perimeter of the canopy outer end, and uniformly engages the canopy via several uniformly spaced straps. The rigid frame and pivoting support passively and uniformly hold the deflated top and side portions of the canopy against the building wall. The frame and pivoting support combine with the lateral stiffening rods and front panel support assembly of the lower panel to fold and uniformly hold the lower panel against the building. The weight and mass of the retracted support assembly and the uniformly compact and folded configuration of the deflated canopy help prevent high winds and gusts of wind from blowing the canopy into the structure-free zone along the tracks. While wind might catch a portion of the canopy, the passive weight, mass and rigid perimeter structure of the frame, hold the canopy and lower panel in place and keep them from blowing and rubbing back and forth against the rough surface of and projections from dock wall or blowing toward the tracks. The perimeter frame also provides protection from vehicles, carts and people passing by the stored canopy.

The rail shelter support assembly prevents the canopy from dragging along the ground when inflating and deflating. The moving frame is extended by and travels with the inflating canopy to support the otherwise cantilevered end above the ground. The frame surrounds and supports the entire perimeter of the outer canopy end, including the bottom portion formed by its lower panel. The lateral support rods further support the lower panel. The outer end and middle portion of the canopy remain elevated above the ground during the inflation and deflation of the floppy canopy. The canopy remains elevated above the ground, even in situations where the tracks are located further from the building and the canopy must extend a greater distance. The stones and debris along the tracks and building do not damage the shelter.

The rail shelter passively retracts into its stored position against the building wall. When the canopy is inflated by the blower motor, the canopy, frame and stiffening rods are elevated along an outward and slightly upwardly curved, pendulum-like path of travel set by the pivoting support bars. The weight of the frame and support assembly rise several inches. When the blower motor disengages, the weight of these components passively push the air out of the canopy and uniformly compress it via the canopy straps. The weight of the bottom curtain stiffening rods front support assembly also push the canopy and lower panel back toward the building wall. The passive forces exerted on the canopy by these components speed up the retraction of the canopy and help ensure that the canopy stays in place against the building wall. No bungee cords are needed.

The rigid frame uniformly and consistently engages the entire perimeter of the canopy. The straps are uniformly spaced around the top and side portions of the canopy. The straps have a set uniform length that does not vary as the canopy extends. The straps maintain a relatively constant and lower level of pulling force on the canopy fabric even when the canopy is fully extended. This uniform and lower level of pulling force does not tear or otherwise damage the fabric or hemmed seams of the canopy. The lower panel assembly includes a thin, flexible bottom panel with lateral support rods and a front support assembly. The lateral support rods and front support assembly span the width of the canopy to uniformly support the front end and middle section of the bottom panel.

The present rail shelter stabilizes the outer end of the canopy when extended to seal against the boxcar. The stabilizing frame uniformly engages the canopy along its outer end. The rigid frame engages and supports the perimeter of the outer end of the canopy to maintain its shape and stabilize the location of its engagement and seal around the boxcar doorway. The rigid frame allows the outer canopy end to resist the pressure and forces caused by high winds and gusts of wind that can push it back and forth over rough rusted surfaces and projects of the boxcar. The frame also prevents wind from blowing the canopy against the dock leveler, and supports it against the weight of accumulating snow, ice and rain when extended. The canopy reliably inflates and seals against a boxcar, and remains properly aligned and held against the boxcar to facilitate loading and unloading operations, while avoiding the problems and wear and tear caused by wind and weather.

The rail shelter stabilizes the canopy as it moves between deployed and retracted positions. The frame travels with the canopy and remains in a generally vertical and parallel alignment with the building wall. Should the canopy inflate unevenly, the frame guides the otherwise unwieldy canopy along a desired path of travel toward the boxcar doorway. The frame keeps the otherwise floppy canopy aimed at the boxcar doorway when it is not fully inflated and otherwise droops down or is blown out of alignment with the doorway.

The rail shelter accommodates varying railcar configurations and track locations. The pivot rods are sized for site specific installations. The pivot rods are sufficiently long that they allow the canopy to properly align with the doorways of wider and narrower boxcars. The length of the pivot rods can also be adjusted to accommodate a wide variety of track locations relative to the building.

The rail shelter accommodates non-parallel alignment between the tracks and the building. Should the tracks, and thus the boxcar, be slightly angled out of parallel to the building, the pivot rods include swivel brackets that allow one side of the canopy to extend further out than the other to accommodate this non-parallel alignment. The support frame and swivel brackets provide a degree of freedom to allow proper engagement by the canopy around the boxcar doorway without applying unnecessary forces to the frame or wall.

The present dock rail shelter provides a 360 degree enclosure around the dock leveler and railcar doorway. The bottom curtain seals under the dock leveler to close the openings along the sides of the leveler. This 360 degree enclosure greatly reduces or prevents heat, cold, humidity, wind, dust and insects from entering the interior of the loading dock.

The dock rail shelter also minimizes wind loads from being transmitted by the support structure to the building while the canopy is being deployed and retracted. The swivel brackets allow the frame and pivot rods to twist or move sideways should a gust of cross wind engage the side of the canopy during its deployment or retraction. The pivot rods do not transmit significant lateral torque loads to the building.

Other aspects and advantages of the invention will become apparent upon making reference to the specification, claims and drawings.

BRIEF DESCRIPTION OF THE DRAWINGS

FIG. 11 is a side view of the loading dock rail shelter with longer pivot supports in its deflated home position and its inflated extended position to show an even lower radius curved path of travel of the frame, canopy and bottom panel as they pivot forward to the inflated extended position.

FIG. 12 is a perspective view of the bottom curtain assembly with an enlarged detail showing the structure of its front support.

DESCRIPTION OF THE PREFERRED EMBODIMENT

While this invention is susceptible to embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1:
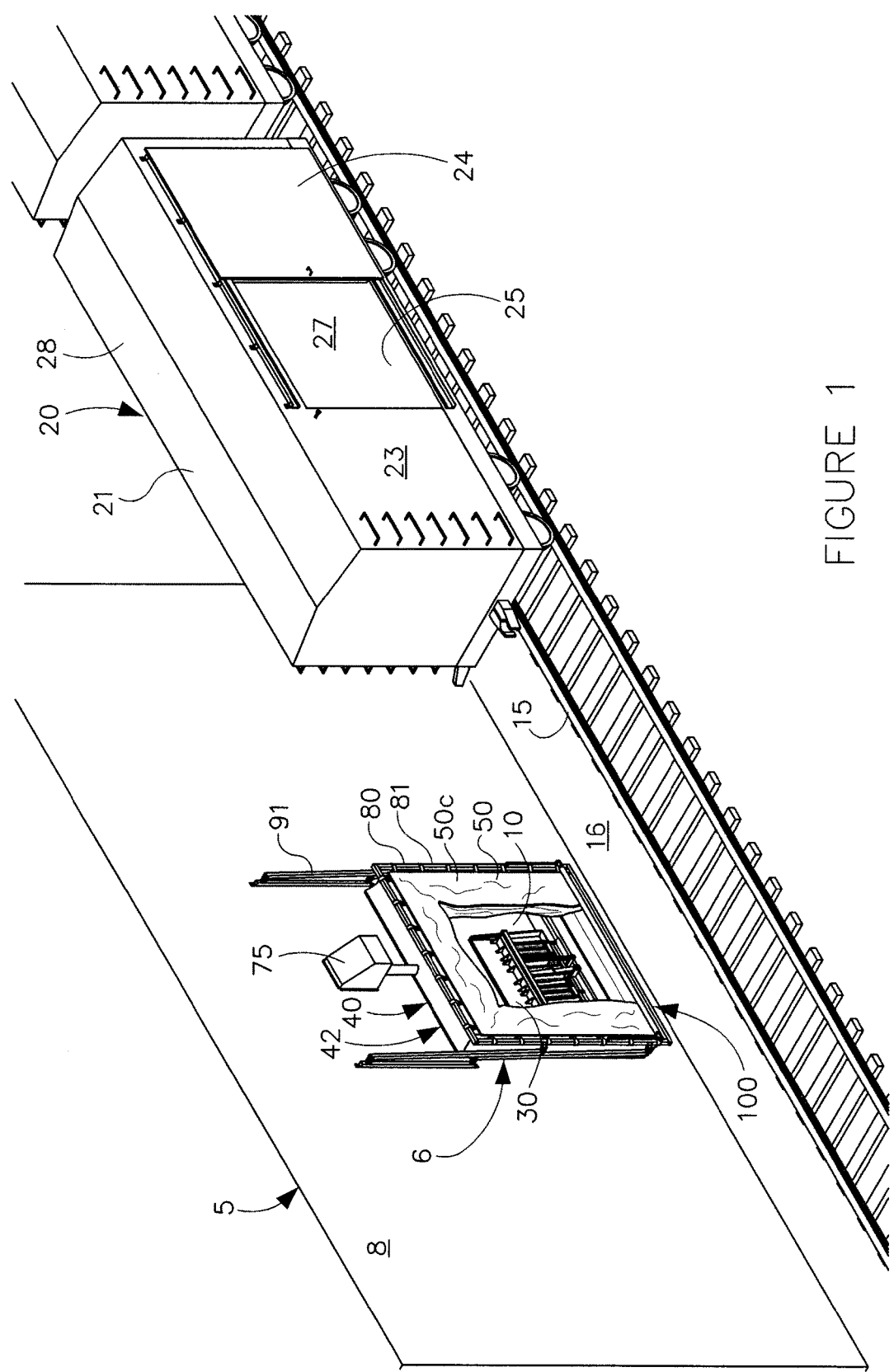
FIG. 1 is a perspective view of the inflatable loading dock rail shelter installed around a loading bay equipped with a dock leveler and located near railroad tracks transporting railroad boxcars.

Modern commercial buildings 5 for manufacturing, warehousing, distributing and selling goods are equipped with loading docks or bays 6 to efficiently move goods, supplies, furniture, equipment and other forms of cargo in and out of the building. The loading docks 6 have a generally flat, horizontal, elevated floor surface 7 relative to its generally vertical and planar exterior walls 8 to define the interior 9 of the building 5 as shown in FIG. 1. The loading bay 6 has an elevated doorway or opening 10. A door such as an overhead door (not shown) is used to selectively open and close the doorway 10. The overhead door seals the doorway 10 when the dock is not in use. The door is opened when a railroad car 20 pulls up alongside the dock 6 and doorway 10 to load or unload cargo. The front wall 8 extends from the ground surface 16 up to the elevated dock floor 7, and continues up to enclose the building interior 9. The loading bay 6 is typically equipped with a dock leveler, such as a vertically stored, telescoping lip dock leveler 30 as discussed below.

Figure 2:
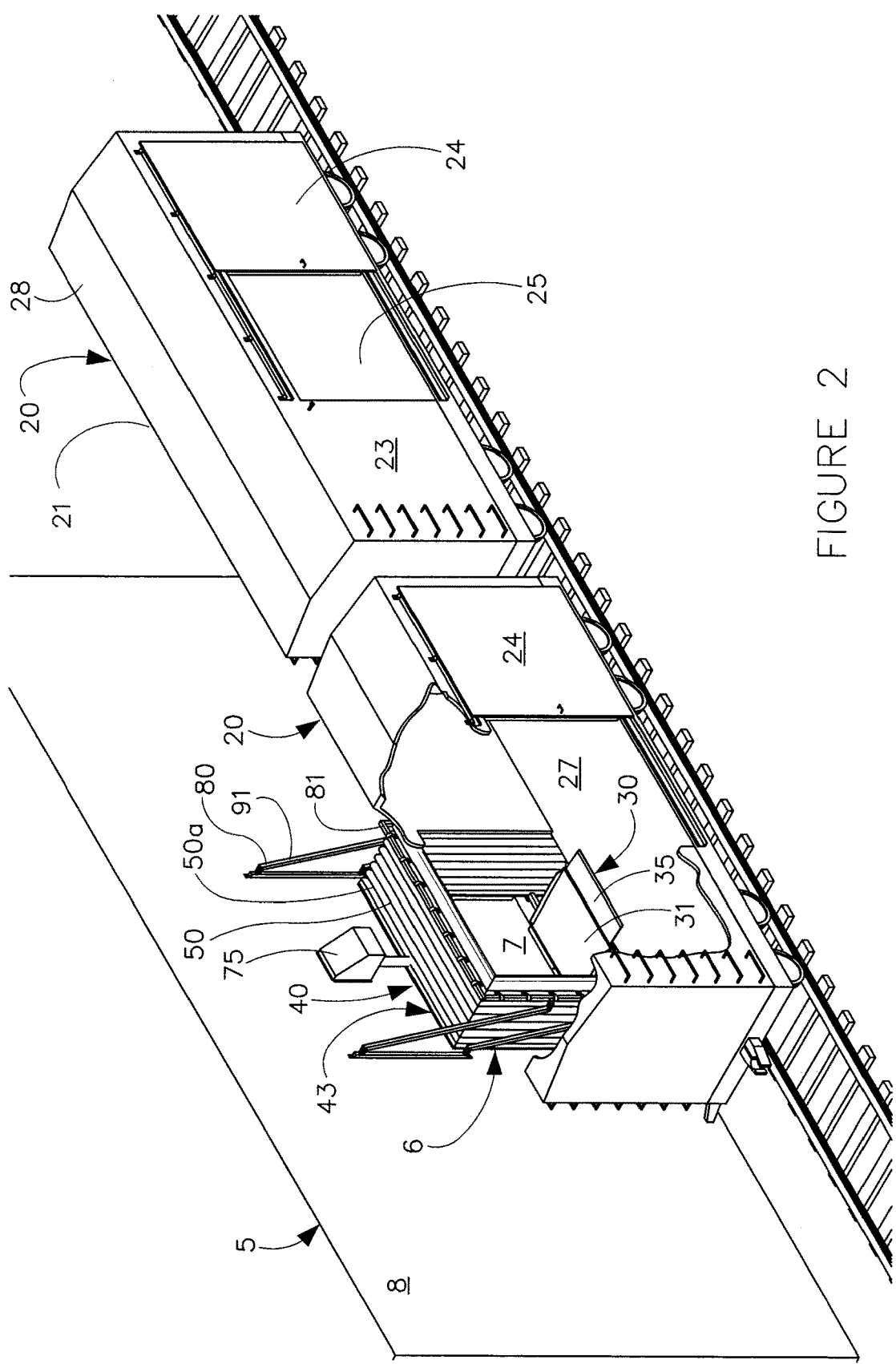
FIG. 2 is a perspective view of the inflatable loading dock rail shelter aligned with a boxcar doorway and inflated to seal around the doorway with the dock leveler deployed to bridge the gap between the loading bay floor and the boxcar floor.

The loading dock 6 is designed to facilitate access to a railroad car 20 such as a boxcar traveling on tracks 15 passing a set distance from the exterior wall 8 of the building 5 as shown in FIGS. 1-2. The rail car 20 has wheels that travel along the tracks, and a chassis that support its box-shaped body 21. Boxcars have vertical sidewalls 22 and end walls, a horizontal floor 27, and a pitched roof. The sidewalls 22 have an outer surface 23 that can include a number of projecting components. Each sidewall 22 has a door 24 that moves between open and closed positions to allow access through a doorway 25. The doorway 25 is typically near the middle of the boxcar sidewall 22, and is defined by its opposed sides 26a, header 26b and threshold 26c.

The building 5 is spaced from the tracks 15. The tracks 15 are generally parallel to the building wall 8, and the boxcar sidewalls 22 are generally parallel to the building wall. The tracks 15 and boxcar floor 27 are generally horizontal and parallel to the building floor 7. For a variety of reasons, including the safety of the trains and people on the trains or by the building, railroad codes do not allow structures to be within about nine feet (9') of the centerline of the tracks 15. The ground 16 between the building 8 and the tracks 15 is typically level or dips down to accommodate drainage away from the tracks. The ground surface 16 typically includes drainage rocks. Debris is often laying on the ground 16 between the tracks 15 and building 5. The rocks and debris can be quite rough, sharp or jagged, and can damage shelter materials that are pushed or dragged over them.

Boxcars 20 have a variety of body 21 configurations. The height of the floor 27 is typically about forty-two inches (42") above the tracks. Loading bays 6 are typically built with a floor 7 at or about that same height. The height and width of the boxcar body 21 vary in size and shape. The width of a wider boxcar 20 is about ten feet, eight inches (10'8"). The width of a narrower boxcar 20a is about nine feet four inches (9'4"). The height of a taller boxcar 20 is about sixteen feet, six inches (16'6") above the tracks 15. The height of a shorter boxcar 20*b* is about fourteen feet, six inches (14'6') above the tracks. Boxcar doorways 25 are typically rectangular in shape, but come in a variety of sizes. The doorway 25 height is about twelve feet (12') for a taller boxcar 20 and about ten feet (10') for a shorter boxcar 20*b*. Doorway 25 widths are typically between ten feet (10') and eleven feet (11'), but some double doors boxcars have a width of sixteen feet (16'). Boxcar roofs 28 are pitched toward their sidewalls 22 so that snow, ice and rain flow off the roof and over or down the sides 22 of the car 20.

The dock leveler 30 is deployed to bridge the gap between the building floor 7 and boxcar floor 27. The leveler 30 has a rigid deck 31 with an extendable lip 35. The deck 31 is pivotally movable between raised and lowered positions 32 and 33. The lip 35 telescopes or otherwise moves between retracted and extended positions 36 and 37. The rear end of the deck 31 is pivotally secured to the building 5, so that its rear end is generally flush with the dock floor 7 when the leveler 30 is lowered 33. The leveler 30 is raised to its vertical or stored position 32 when not in use so that a door (not shown) of the loading bay 6 can be closed to seal off the interior 9 of the building 5. The leveler 30 is sized to accommodate site requirements. The length of the deck 31 is sized to accommodate the distance between the building 5 and the tracks 15 and boxcar 20. The deck 31 and lip 35 lengths are sized to accommodate both wide and narrow boxcars 20, 20*a*. When aligned a wider boxcar 20, the front or free end of the lowered 33 deck 31 approaches, but does not strike, the boxcar sidewall 22. Then, the lip 35 is partially 38 or fully extended 37 to rest on the boxcar floor 27. When aligned with a narrow boxcar 20*b*, the free end of the deck 31 is spaced several inches from the boxcar sidewall 22. The lip 35 is fully extended 37 to rest on the boxcar floor 27.

The present invention pertains to a loading dock rail shelter generally indicated by reference number 40 as in FIGS. 1-12. The rail shelter 40 forms an enclosed pathway 41 that joins the building interior 9 to the railcar interior 29. The shelter 40 has a variety of components including a mounting structure 45, an inflatable canopy 50, a retractable canopy support 80 and a lower panel assembly 100. The shelter 40 is designed to move through a range of motion between fully deflated and inflated positions 42 and 43 to form a continuous seal 70 around the railcar doorway 25. When fully deflated 42, the retractable support 80 stabilizes and retains the floppy collapsed canopy 50 and folded bottom panel assembly 100 against the building wall 8. When inflated 43 to extend, press against and form a seal 70 with the boxcar sidewall 22, the extended support 80 stabilizes the canopy 50 around the boxcar doorway 25, and extends the bottom panel assembly 100 to close the openings along the sides of the leveler 30. The support 80 holds up both the canopy 50 and bottom panel assembly 100 so neither drags along the ground 16 as they move between deployed and retracted positions 42 and 43.

Figure 4:
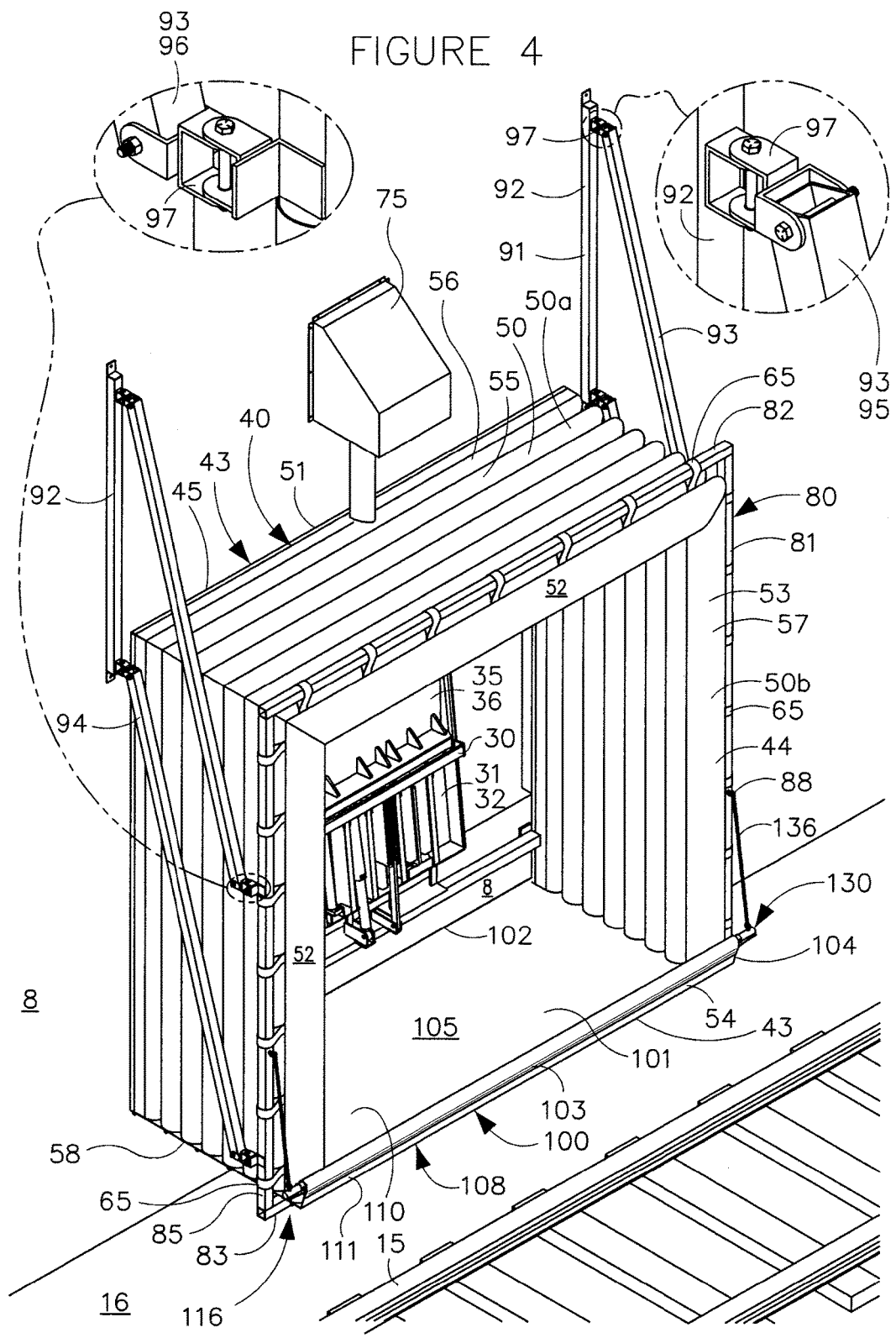
FIG. 4 is a perspective view of the loading dock rail shelter in its fully inflated and extended position and the dock leveler in its stored vertical position.
Figure 5:
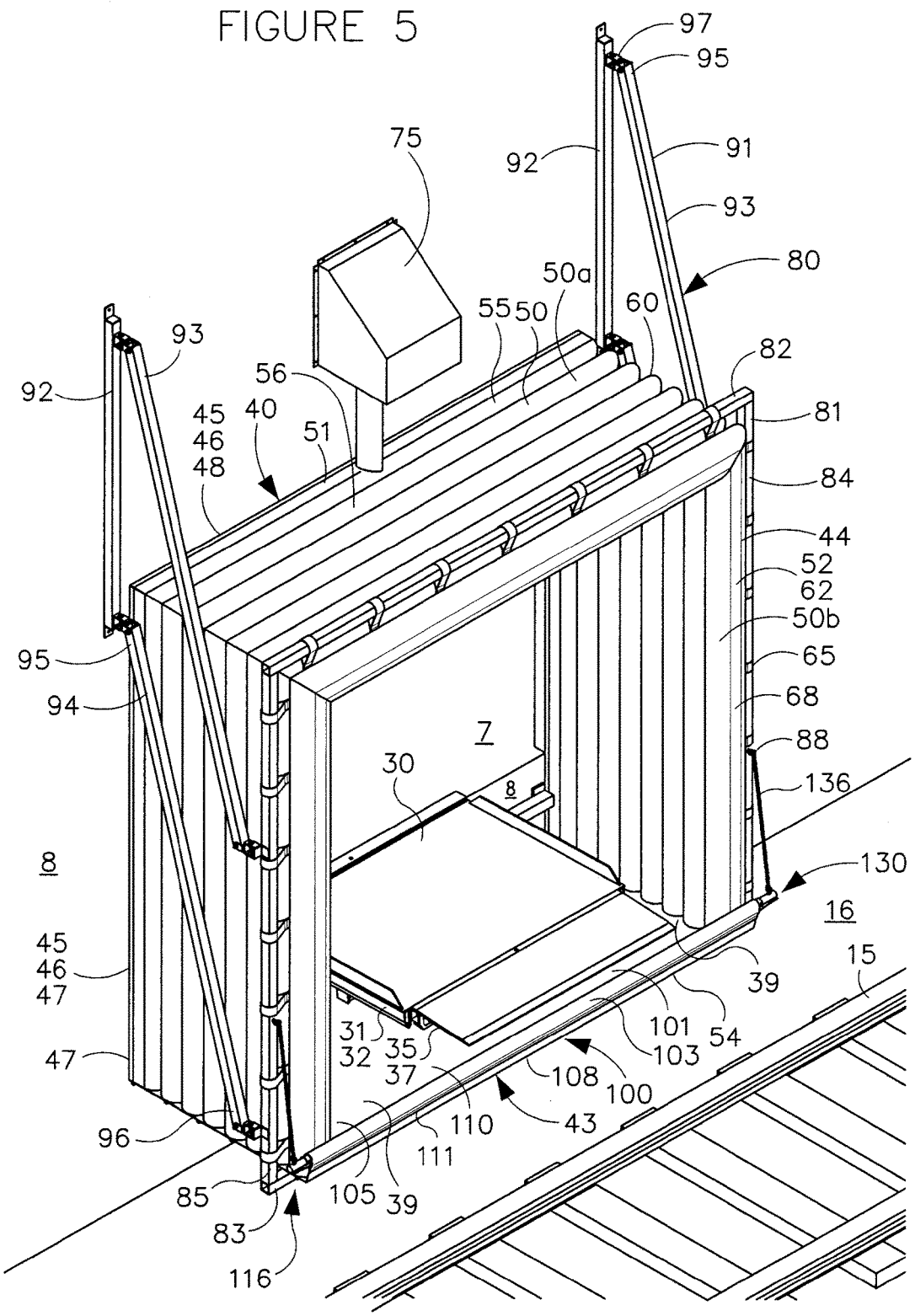
FIG. 5 is a perspective view of the loading dock rail shelter in its fully inflated and extended position and the dock leveler in its lowered position.

The canopy mounting structure 45 is robustly designed to support the weight of the canopy 50 and common loads experienced by the canopy during use, such as wind and snow loads. The canopy mounting structure 45 is formed by a number of backer boards 46 including side boards 47 and a header board 48 as shown in FIGS. 4-5. The backer boards 46 are preferably made of pressure treated or otherwise weather resistant wood, such as 2 by 12 lumber or the like. The boards 46 are anchored or otherwise rigidly secured to the exterior of the building wall 8. The boards 46 have a length sized to accommodate the height and width of the bay opening 10. The side boards 47 extend vertically along the building wall 8, and are spaced from and parallel to the sides of the door opening 10. The side boards 47 are equally spaced from the center of the door opening 10. The placement of the side boards 47 defines the width of the header board 48. The header board 48 extends horizontally above the doorway 10. The front surface of each board 46 is flush with the front surface of its adjacent boards, and they are generally parallel to the dock wall 8.

The canopy 50 has a fixed end 51 and a free or outer end 52 that moves away from the fixed end when the canopy is inflated. The fixed or stationary end 51 is rigidly secured to the building wall 8 around the bay opening 10 via the backer boards 46 and securement clips. When the canopy 50 inflates, its outer free end 52 moves through a range of motion between retracted and extended positions 42 and 43. The canopy 50 has an inflated configuration 50*a* when extended 43 as shown in FIG. 5. In the illustrated embodiment, the inflated 43 canopy 50 has a rectangular or square, cross-sectional shape 50*b* with a horizontal top, equal length vertical side portions, and an open horizontal bottom of equal width to its top. The inverted U-shaped cross-sectional configuration 50*b* is uniform along its inflated 43 length.

When extended 43, the canopy 50 forms an enclosure or enclosed pathway 41 between the building and railcar doorways 10 and 25, and its outer end 52 engages and forms a continuous seal 70 around boxcar doorway 25. The canopy 50 has an open interior that forms the open shelter interior 41. The canopy 50 preferably has an upper inflatable portion 53 with a top and two sides that form the inverted U-shaped cross-sectional configuration 50*b*. The top and sides simultaneously inflate, and simultaneously deflate. The upper inflatable portion 53 is preferably combined with a cooperating flexible lower portion 54 that moves in unison with the upper portion 53 between retracted and extended positions 42 and 43. The lower portion 54 need not inflate, such as with lower panel assembly 100 as discussed below.

The canopy 50 is preferably formed by a series of like-shaped air bags 55. Each air bag 55 has a horizontal upper portion 56 and two opposed vertical side portions 57. The side portions 57 have a bottom end 58. Adjacent airbags 55 are joined along a seamed joint 59 with pathways (not shown) that allow the passage of air between them. Each airbag 55 is pneumatically connected to its adjacent airbag, and the top and side airbag portions 56 and 57 are pneumatically connected so that they all inflate and deflate simultaneously. The inflated 43 airbags 55 form the outer undulating perimeter 60 of the canopy 50. When inflated 43, each airbag 55 has a forward projection of about ten inches (10") so that a shelter 40 with seven airbags has an unobstructed forward projection 44 of about seventy inches (70"). The amount of the unobstructed forward projection 44 is sized for specific site installations to ensure the outer canopy end 52 compressingly engages and forms a continuous seal 70 with the railcar sidewall 23. The canopy 50 can include more or fewer airbags 55, or the inflated size or shape of the airbags can be increased or decreased.

The canopy 50 includes a rearmost, outermost, second from outermost and several intermediate airbags 61-64. The rear airbag 61 is fixed to the wall 8 of the building 5 via the mounting structure 45. The upper portion 56 of the rear airbag 61 has a blower duct or sleeve 61*a* to allow air to enter and exit the inflatable upper portion 53 of the canopy 50. Frame securement straps 65 extend from the seemed joint 59 between the outermost 62 and second from outermost 63 airbags of the inflatable upper canopy portion 53.

Figure 6:
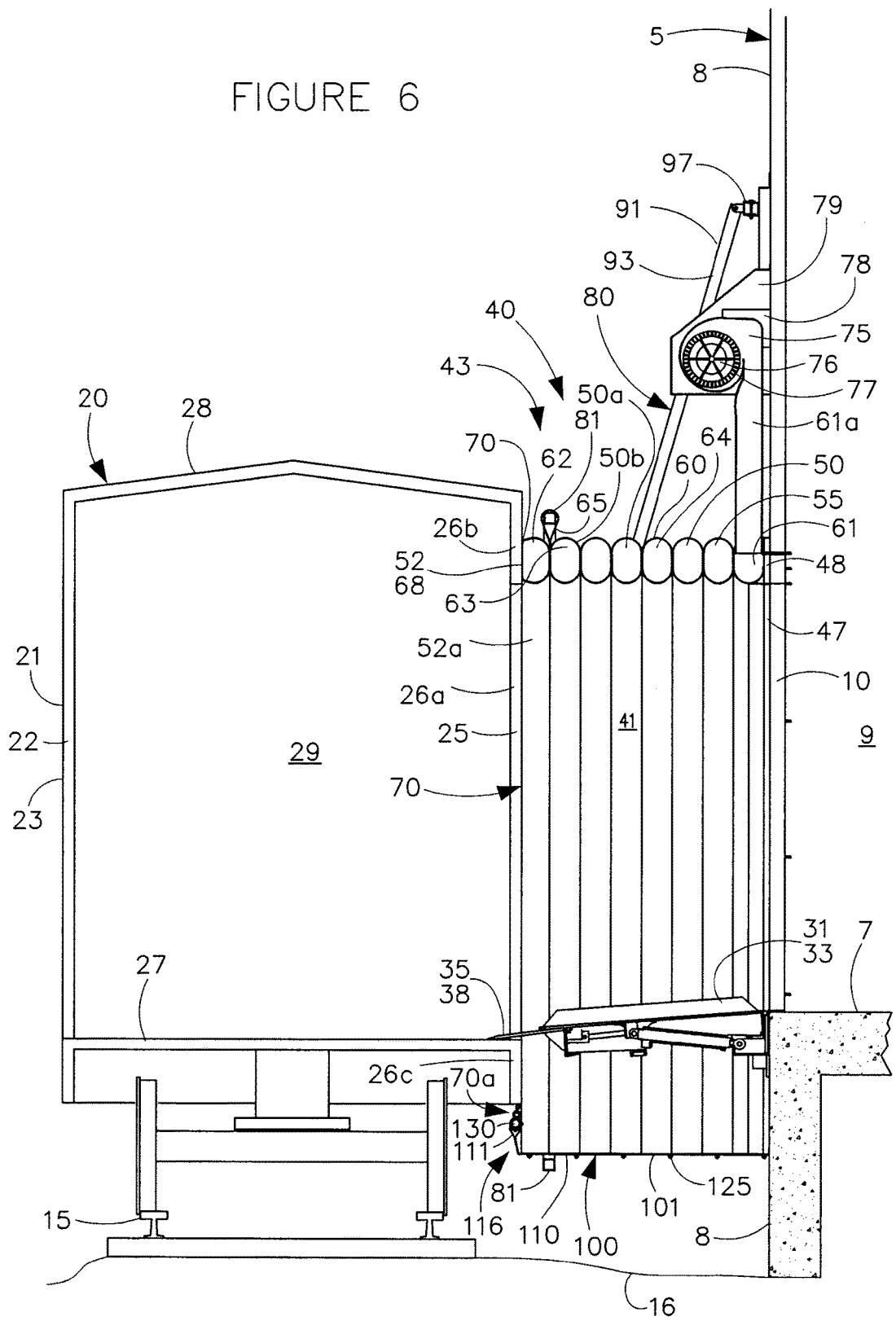
FIG. 6 is a side sectional view of the loading dock rail shelter showing the inflated shelter sealed against the sidewall of a wider boxcar and with the dock leveler lowered with the front of its deck located near the sidewall of the boxcar and its lip partially extended and resting on the boxcar floor.
Figure 7:
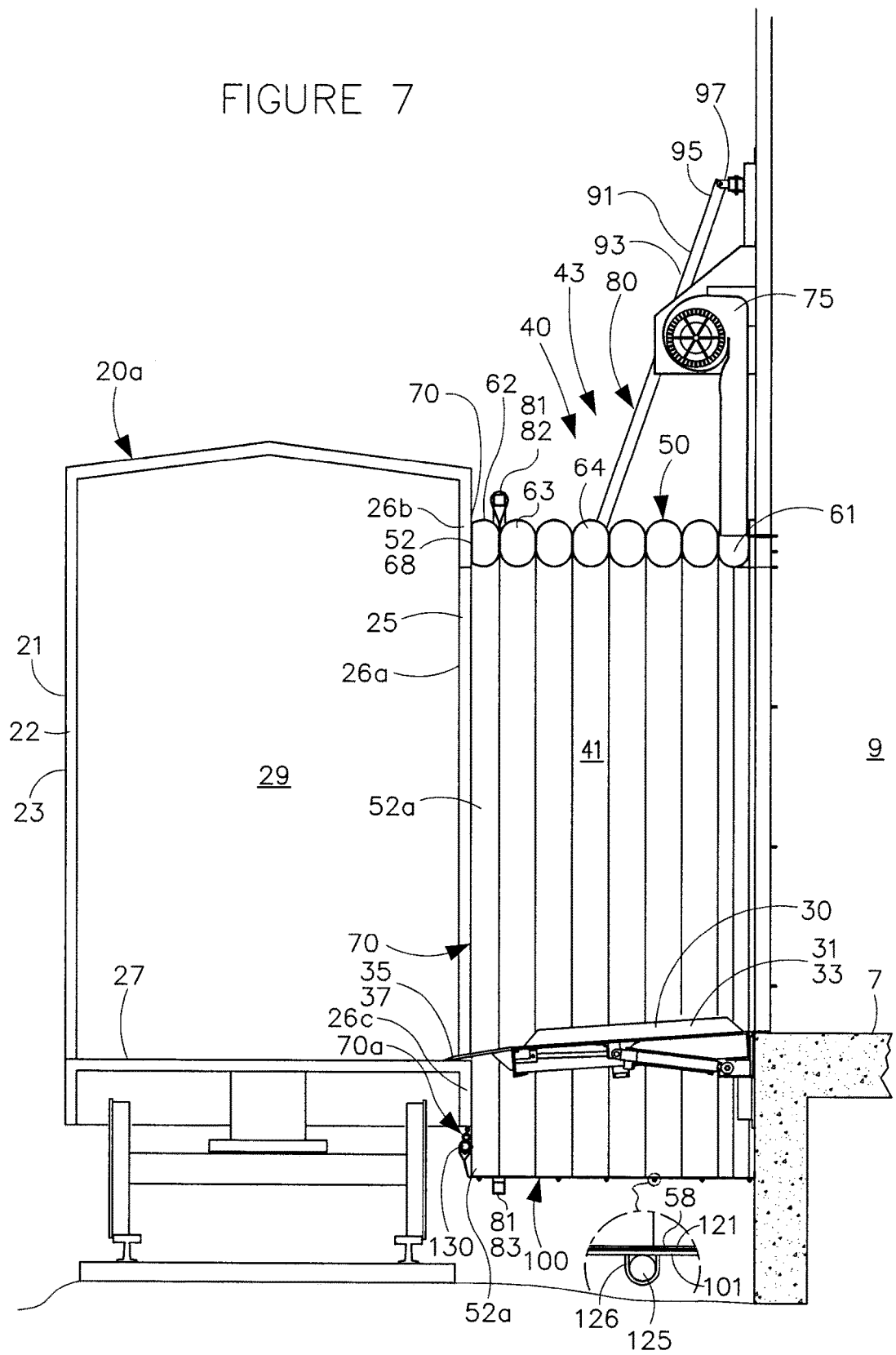
FIG. 7 is a side sectional view of the loading dock rail shelter showing the inflated shelter sealed against the sidewall of a narrower boxcar and the dock leveler lowered with the front of its deck spaced from the boxcar sidewall and its lip fully extended and resting on the boxcar floor.
Figure 8:
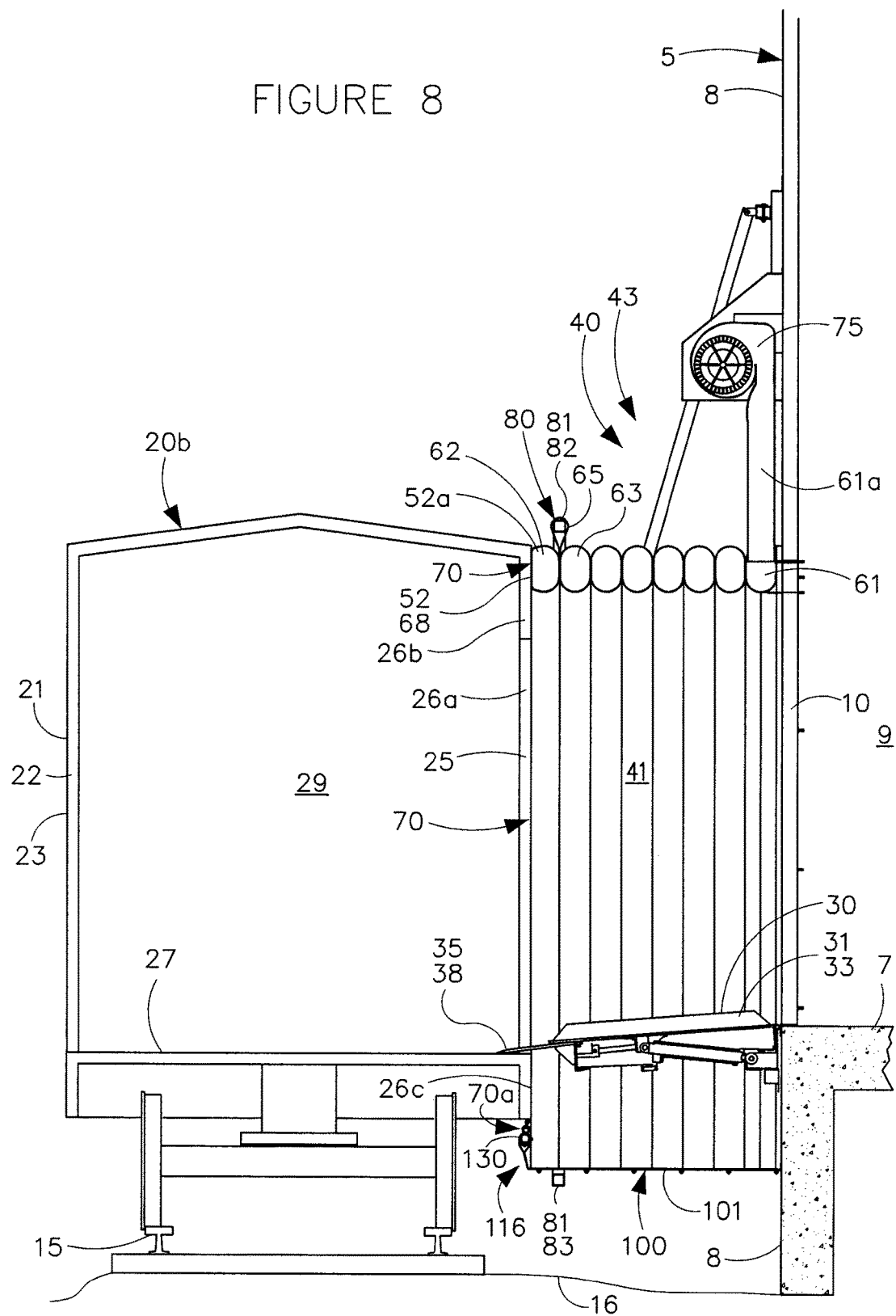
FIG. 8 is a side sectional view of the loading dock rail shelter showing the inflated shelter sealed against the sidewall of a shorter boxcar and the dock leveler lowered with the lip fully extended to bridge the gap between the loading bay floor and the boxcar floor, and with an enlarged detail showing a stiffening rod and securement strip on the bottom curtain.
Figure 9:
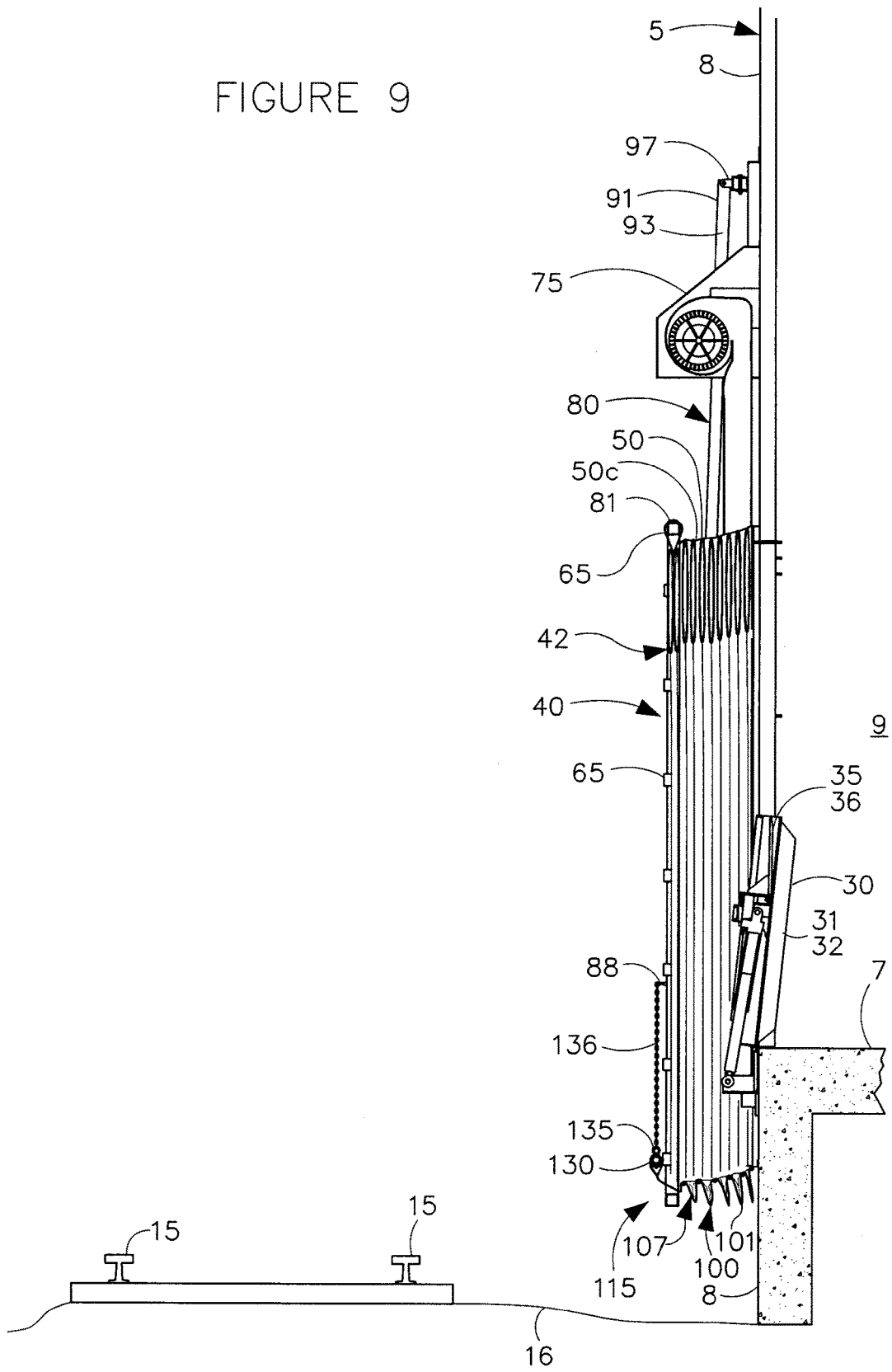
FIG. 9 is a side view of the loading dock rail shelter in its deflated or home position against the wall of the building and the dock leveler in its stored vertical position.

When inflated 43, the outermost airbag 62 projects or extends forward from the forward edge of the vertically planar frame 81 at least about the inflated length of the outermost airbag 62 as best shown in FIGS. 6-8. This forward canopy end projection 52a relative to the frame 81 spaces the frame from the railcar sidewall 23 when the canopy is inflated 43 so that the frame does not interfere with the formation of the continuous seal 70. The lengths of the fasteners 65 can have slack (not shown), which increases the forward canopy end projection 52a because the frame is biased rearwardly as discussed below. When the fastener 65 have slack, a Velcro strip secured inside the loop joins its loop sides together.

The fastener straps 65 extend outwardly from the perimeter 60 of the canopy 50 proximal to and inwardly from its extendable outer end 52 so that the frame 81 does not contact the railcar 20 or otherwise interfere with the formation of the continuous seal 70. Each strap 65 has an inner end that is hemmed or otherwise fixed to the seamed canopy joint 59, and an outer end that extends outwardly from the perimeter 60 of the canopy 50. The straps 65 preferably take the form a form a loop. The looped end of each strap 65 is wrapped around and held by the frame 81. When folded and fixed to the canopy 50, each looped strap 65 has a length of about ten inches (10") from its hemmed joint 59. The length of the top straps 65 are generally shorter than the length of the side straps because the frame side beams 84 and 85 are spaced about four inches (4") from the inflated 43 canopy sides 57, while the frame top and bottom beams 82 and 83 more flushly or snugly receive the inflated canopy top 56 and bottom 58. The straps 65 lengths are sized so that each strap pulls relatively equally on the inflated 43 or deflating canopy 50.

When inflated 43, the outer canopy end 52 or forward portion of the outermost airbag 62 forms a sealing surface 68 that compressingly engages the surface 23 of boxcar sidewall 22. The sealing surface 68 forms a continuous seal 70 around the sides 26a and top 26b of the railcar doorway 25. The sealing surface 68 compressably engages the sidewall surface 23 of the railcar 20 when the railcar door 24 is the type that slides open along an interior mounting track or swings open inwardly. The sealing surface 68 compressably engages the outer surface of the railcar door 24 when the door is the type that slides open along an exterior mounting track, or against the inside surface of the door 24 when the door is the type that swing opens outwardly.

The canopy 50 is inflated by a conventional pneumatic blower 75 with an electric-powered motor 76 as best shown in FIGS. 6-9. The blower 75 has a port 77 through which outside air is drawn when inflating the canopy 50, and through which air is exhausted when deflating the canopy. The blower 75 is mounted to the exterior of the building wall 8 above the canopy 50 via mounting brackets 78. The blower 75 has a discharge nozzle secured to the blower sleeve 61a of the rear airbag 61. A hood 79 is placed over the blower 75 to protect it from dirt and weather.

The blower 75 produces an internal canopy pressure sufficient to extend the canopy 50 and form the seal 70 around the boxcar doorway 25 without damaging or requiring reinforcement of the building wall 8. The blower 75 remains on while the canopy 50 is deployed during loading and unloading operations. The internal canopy pressure is preferably about 0.6 pounds per square inch above atmospheric conditions, so the seal 70 is a softer seal and the outer canopy end 52 or seal area 68 readily conforms to the shape of the surface of the railcar sidewall 23 or door 24 against which it is pressed. The blower 75 has a volumetric flow rate of about 1,200 cubic feet of air per minute. When the electric blower motor 76 is activated, the blower 75 takes in outside air through its port 77, and pushes compressed air into the canopy 50 via canopy sleeve 61a. When the blower motor 75 is deactivated, the air inside the canopy 50 equalizes with the atmosphere as its compressed internal air releases through the blower sleeve 61a and port 77 and the canopy deflates.

The retractable canopy support 80 includes a rigid frame 81 and a pivoting support mechanism 91. The frame 81 has a planar, four-sided construction. The frame 81 has a generally rectangular shape and is formed by four elongated metal beams 82-85 that define both its outer perimeter and its open interior for receiving the canopy 50. Parallel upper and lower crossbars 82 and 83 form its top and bottom, and opposed vertical bars 84 and 85 form its sides. The ends of each beam 82-85 are bolted, welded or otherwise rigidly joined to the ends of its adjacent beams. The frame 81 forms a rigid perimeter structure 86 with an open interior 87 that receives the inflated canopy 50. The three-sided or four-sided canopy 50 has a generally square or rectangular cross-sectional shape.

Figure 3:
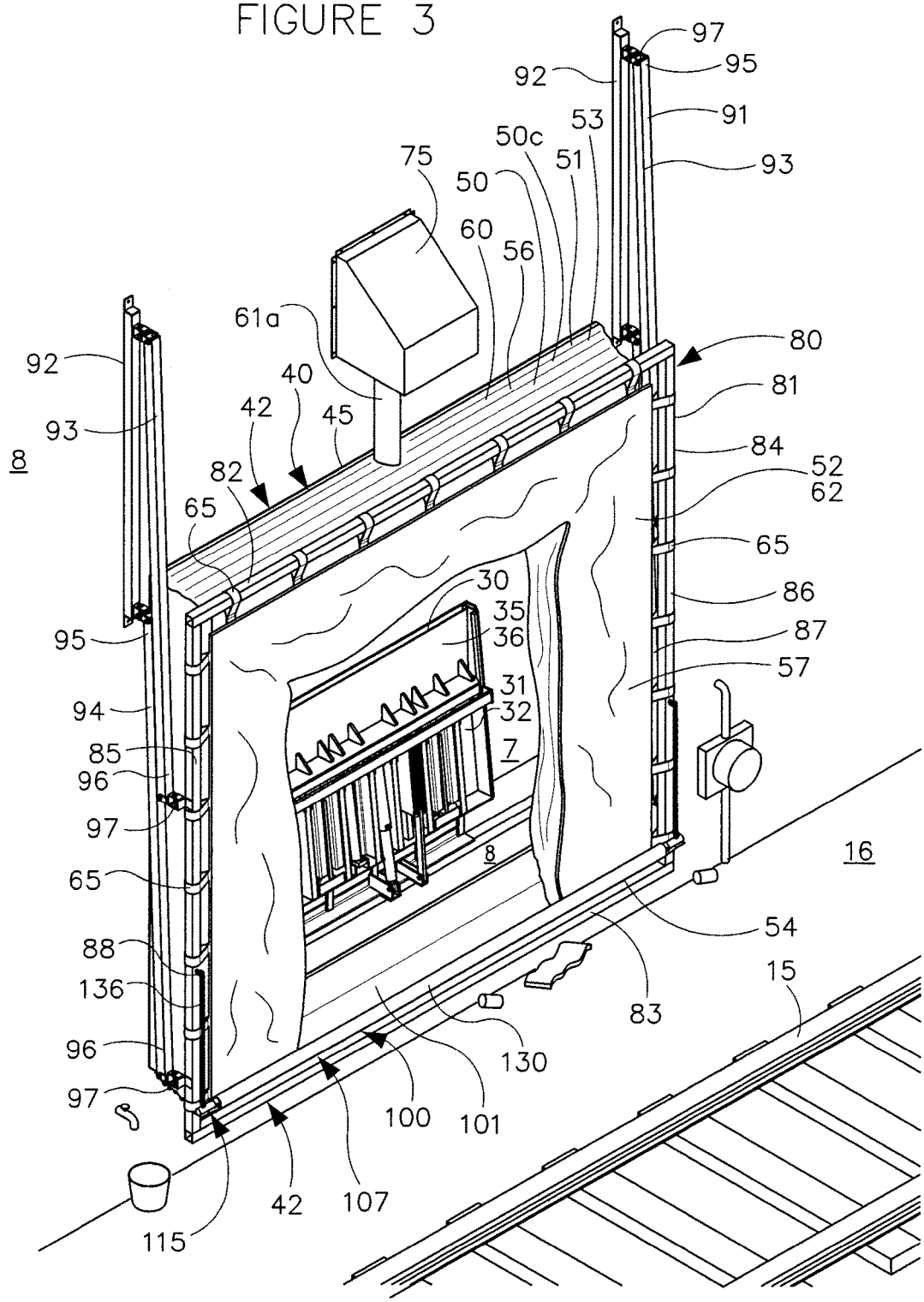
FIG. 3 is a perspective view of the loading dock rail shelter in its deflated or home position and the dock leveler is in its stored vertical position.

The perimeter 86 and open interior 87 of the frame 81 have a similar, albeit slightly larger, square or rectangular shape than the perimeter 60 of the canopy 50 so that the top 56, sides 57 and bottom 54 canopy portions fit inside the frame 81 and are in close proximity to their respective top, side and bottom frame beams 82-85 as shown in FIG. 3. When the retractable support 80 is mounted to the building 5, the lateral side beams 84 and 85 of the frame 81 are centered relative to the bay opening 10. The top and bottom beams 82 and 83 are located above and below the top and bottom of the bay door 10, respectively. The frame 81 and its beams 82-85 hold and support the canopy 50 near its outer end 52. The frame 81 continuously holds the canopy 50 proximal its outer end 52 in its inflated cross-sectional shape 50b when in its retracted 42 and inflated 43 positions and as it moves between its retracted and inflated positions. The frame 81 continuously holds the otherwise floppy and unwieldy deflating canopy 50 from dragging on the ground, and maintains it in a generally uniformly compacted arrangement 50c against the building wall 8 as in FIGS. 3 and 9.

The canopy straps 65 are looped around or otherwise fastened to the frame 81. The fasteners 65 are free to rotate axially about their respective frame member 82, 84 and 85, but the fasteners and perimeter 60 of the canopy 50 are held in place by those frame members from moving radially inward or toward the center of the canopy interior 41. The fastened portion of the deflating and deflated 42 canopy 50 generally retains its inflated inverted U-shape cross-sectional configuration 50b. The straps 65 are uniformly spaced along the upper frame member 82 and side frame members 84 and 85. The looped straps 65 extending from the top portion 57 of the canopy 50 are secured to the horizontal upper frame member 82 to support and hold the top portion 56 in a horizontal alignment parallel to the frame member 82. The looped straps 65 extending from the side portions 57 of the canopy 50 are secured to the vertical side frame members 84 and 85, respectively, to position and hold the side portions 57 in a vertical alignment parallel to the side frame members 84 and 85.

The frame 81 and canopy straps 65 support and hold the canopy 50 proximal to and inwardly from its extendable end 52 to retain its inverted U-shaped configuration 50b as it inflates and deflates between its retracted and extended positions 42 and 43, as well as when it is in its retracted and extended positions. The frame 81 and straps 65 maintain the inflated 43 canopy 50 and its extended end 52 in their desired inflated shapes 50a and 5b when wind and whether push it, or when it begins to sage over time due to normal wear and tear. A pair of hooks 88 extend from the side frame members 84 and 85 to support the front panel support 130 as discussed below. Each hook 88 is rigidly secured about a couple feet above the lower end of its frame member 84 or 85.

The pivoting support mechanism or assembly 91 includes two spaced mounting supports 92 and two sets of elongated upper and lower pivot rods 93 and 94. The mounting supports 92 are rigidly secured to the building wall 8 above the bay doorway 10 and upper frame crossbar 82, and are in planar and parallel alignment with frame side supports 84 and 85. The upper end 95 of each pivot rod 93 and 94 is pivotally connected to the upper end of its fixed support 92 via a swivel bracket 97. The lower end 96 of each pivot rod 93 and 94 is pivotally connected to the frame 81 via a similar swivel bracket 97. The lower or swinging ends 96 of the upper pivot rods 93 are preferably joined to side frame members 84 and 85 above the middle or center of mass of the frame 81. The lower free ends 96 of the lower pivot rods 94 are joined to the side frame members 84 and 85 proximal the lower end of frame 81.

Figure 10:
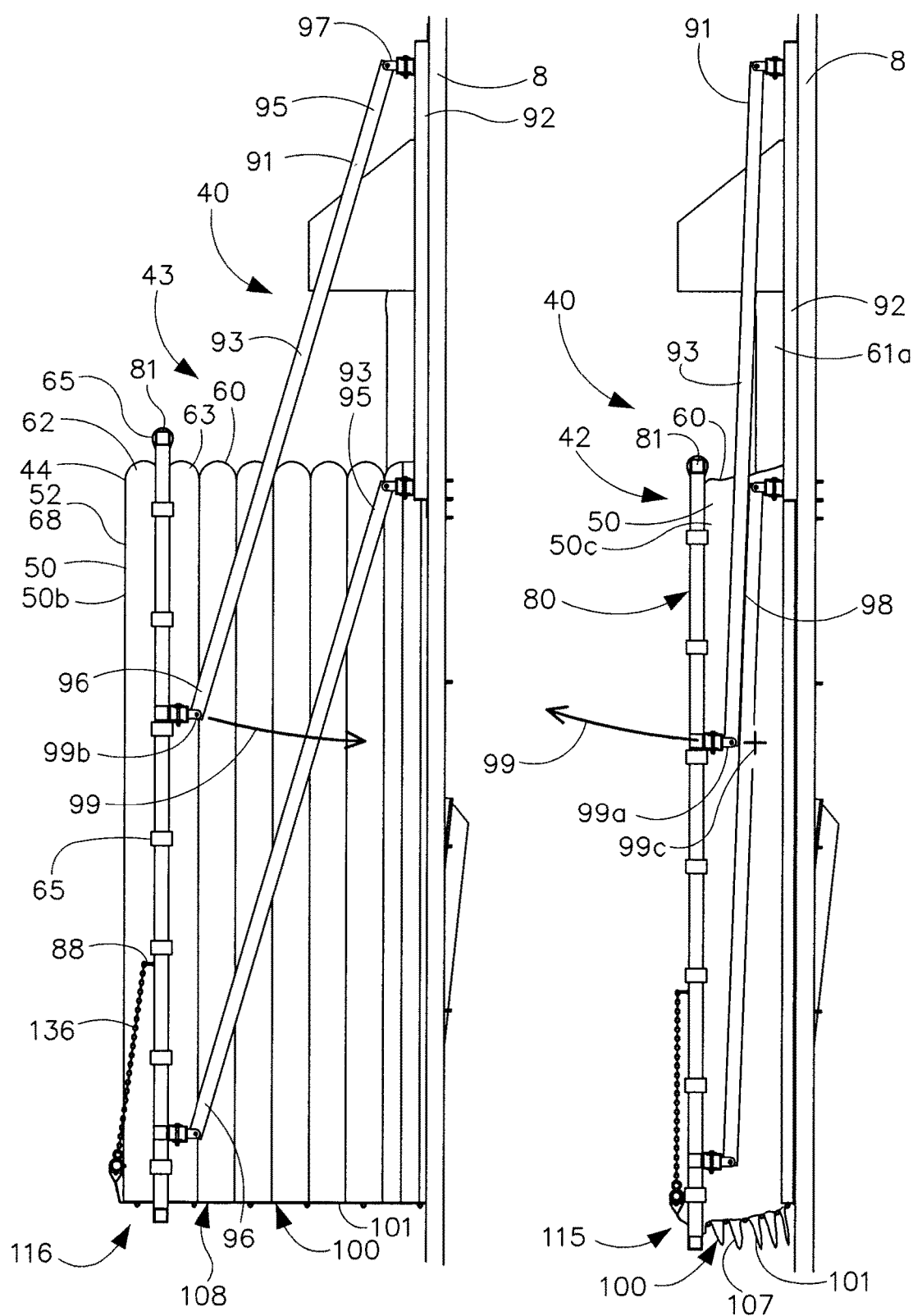
FIG. 10 is a side view of the loading dock rail shelter in its deflated home position and its inflated extended position to show the lower radius curved path of travel of the frame, canopy and bottom panel as they pivot forward to the inflated extended position.

When retracted 42, the rigid frame 81 and elongated pivot rods 93 and 94 hang from the building wall 8 via supports 92. The canopy 50 and support 80 have a maximum stored projection from the building wall 8 of about eighteen inches (18"). Each set of pivot rods 93 and 94 is in overlapping planar alignment. The upper pivot rods 93 overlap with the lower pivot rods 94 as best shown in FIGS. 10 and 11. The rods 93 and 94 of each set are in planar alignment when viewed from the front of the shelter 40. When retracted 42, the rearward surface of the upper rod 93 lays flush against the forward surface of the lower rod 94. The overlapping flush engagement of the rods 93 and 94 prevents the upper rod 93 from swinging back further and forms a rearward stop 98 that spaces the frame 81 from the building wall 8. The rearward stop 98 prevents the frame 81 from swinging further back and overly compressing the deflated and retracted 42 canopy 50. The slight forward and upward rotation of the frame 81 and pivot rods 93 and 94 combine with the mass and perimeter construction of the canopy support 80 to produce an amount of passive resistance that holds the deflated canopy 50 in its stored position 42 against the building wall 8.

The canopy support 80 travels with the canopy 50 as it extends and retracts. When the canopy 50 inflates, the frame 81 and the lower free ends of the pivot rods 93 and 94 are driven forward by the extending canopy 50. The frame 81 and lower ends 96 of the pivot rods 93 and 94 move along a slightly curved, pendulum-like path of travel 99 as shown in FIGS. 10-11. The radius of curvature for the path of travel 99 is set by the length of pivot rods 93 and 94. The low point 99a of the path of travel 99 for the canopy 50 and frame 81 is set by the rearward stop 98 for stored position 42. The high point 99b of the path of travel 99 for the canopy 50 and frame 80 occurs at the maximum extension 44 of the inflated canopy 50 as in FIG. 4. The frame stop 98 halts the rearward movement of the frame 81 slightly forward and above the trough 99c of the arc formed by the pivot mechanism 91. When the pivot rods 93 and 94 are about twelve feet (12') in length and the outer canopy end 52 moves forward about seventy inches (70") from the building wall 8, the pivot rods 93 and 94 swing forward about nineteen degrees (19°) and the frame 81 rises about eight inches (8").

The extension of the front end 52 of the canopy 50 by the blower 75 swings the retractable canopy support 80 forward and slightly upward along its curved path of travel 99. As the canopy support 80 moves forward, its frame 81 continues to hang generally vertically and parallel to the building wall 8. The swivel brackets 97 combine with the equal lengths and parallel orientation of the pivot rods 93 and 94 to keep the frame 81 in its generally vertical and parallel orientation relative to the building wall 8.

When extended 43, the canopy 50 forms a continuous seal 70 around the boxcar doorway 25. The top portion 56 of the canopy end 52 seals 70 against the boxcar sidewall surface 23 along the doorway header 26b and below the lower edge of the roof 28 as shown in FIGS. 6-8. The side portions 57 of the canopy end 52 seal 70 against the boxcar sidewall surface 23 along the doorway sides 26a. When the boxcar door 24 is opened by sliding it outwardly from the doorway 10, the seal is formed against the surface of the door 24, which is generally flush against the boxcar sidewall 22. The lower panel assembly 100 and curtain 101 close the otherwise open lower end between the bottom 58 sides 57 of the otherwise inverted U-shaped canopy 50 as best shown in FIG. 4. When the leveler 30 is lowered 33 to engage the boxcar floor 27, the curtain 101 closes the openings 39 between the sides of the lowered 33 dock leveler 30 and the bottom 58 of the canopy 50 as best shown in FIG. 5. The outer end 52 of the inflated canopy 50 is flexible and conforms to the shape of the boxcar surface against which it presses.

While the amount of upward movement of the frame 81 is established based on site conditions to ensure proper canopy 50 engagement with wider, narrower and shorter railcars 20, 20b and 20c, the canopy 50 and frame 80 typically move upward about eight inches (8") when the canopy engages the railcar. The weight and upward movement of the canopy 50 and frame 80 when extended 43 bias them to swing back and down along path of travel 99 toward their stored position 42.

The flexibility of the design geometry allows for installation flexibility to accommodate different site specific applications. The upper points 95, 97 for securing the frame 81 to the building wall 8 are adjustable up or down. For example, the length of the upper and lower connecting rods 93 and 94 can vary as shown in FIGS. 10-11. The points of securement 95-97 where the rods attached to the building wall 8 and side frame beams 84 and 85 can also vary depending on the overall extension of the shelter 40 to reach the boxcar 20, and the building 5 height and available wall 8 space to secure the shelter. The lower points of securement 96, 97 for the upper pivoting rods 93 to the front upright tubes 84 and 85 can be located at the top of the upright tubes 84 and 85 (not shown), or these joints can be moved down to reduce the distance the connecting rod 93 is fastened to the wall 8 above the shelter 40 as shown in FIGS. 10-11.

The rail shelter 40 self-adjust to accommodate a degree of misalignment between the tracks 15, boxcar 20 and building wall 8. The canopy straps 65 allow one side 57 of the outermost airbag 62 to extend further out from the generally vertical frame 81 than the other side of the outermost airbag to accommodate for out of parallel (yaw) alignment between the tracks 15 and boxcar 20 and the building wall 8. The outer canopy end 52 and its sealing surface 68 distribute a uniform pressure against the boxcar sidewall surface 23 around its doorway 25. The swivel brackets 97 also facilitate for a degree of misalignment. Similarly, should the boxcar 20 lean toward or away from the building wall 8, the rail shelter 40 also self-adjusts to accommodate for out of parallel (roll) alignment between the boxcar and the building wall. The canopy straps 65 allow the top 56 of the outermost airbag 62 to extend further or less than the bottom 58 of the outermost airbag. The straps 65 and swivel brackets 97 give the shelter 40 degrees of freedom to accommodate these misalignments. The continuous seal 70 between the outermost air bag 62 and the boxcar sidewall 22 is not diminished.

The shelter 40 preferably includes a lower panel assembly 100 that forms the lower portion 54 of the canopy 50 as best shown in FIGS. 3 and 12. The panel assembly 100 closes the bottom 58 of the canopy 50 to encircle or encapsulate its interior 41 as shown in FIGS. 4 and 6-8 and close the openings 39 along the side of the lowered 33 leveler 30 as shown in FIG. 5. The panel assembly 100 also forms a seal 70*a* along the chassis or threshold 26*c* of the railcar 20 to fully or partially close the opening along the length of railcar 20 chassis or threshold as shown in FIGS. 6-8. The soft seal 70 of the inflated upper portion 53 of the canopy 50 combines with the seal 70*a* formed by the lower panel assembly 100 to form a 360 degree seal around the railcar doorway 25.

The lower panel assembly 100 includes a large panel or curtain 101 with flexible side securement strips 121, spaced lateral supports 125 and a front support 130. The panel or curtain 101 is thin sheet of flexible vinyl material with a uniform thickness that is durable enough to form a barrier to wind, weather, dirt and dust. The panel 101 has a fixed rear end 102, extendable front end 103 and sides 104, as well as top and bottom surfaces 105 and 106. The width of the panel 101 is sized to match the bottom width of the extended 43 canopy 50. The length of the panel 101 is sized to match the length of the extended 43 canopy 50, with a certain extra length that wraps around and up the outer canopy end 52 to get close to the threshold 26*c* of the train car floor 27. In the shown embodiment, the width and length are roughly ninety inches by one hundred and eighty inches (90"×180"), respectively.

The curtain 101 is secured to the bottom 58 of the side portions 57 of the canopy 50. The fixed 102 and extendable outer 103 panel ends correspond to and are aligned with the fixed 51 and extendable outer 52 canopy ends. The fixed panel end 102 is secured to the building wall 8. Its outer panel end 103 travels with the outer canopy end 52. The lower panel assembly 100 has a range of motion between a folded position 107 (FIG. 3) and an extended or taut position 108 (FIG. 4) that corresponds to the range of motion and retracted 42 and extended 43 positions of the canopy 50.

The panel 101 extends continuously from one side 57 of the canopy 50 to the other. The panel 102 has a major portion 110 that is generally horizontally when extended 43. The front end 103 of the panel 101 includes an upwardly extending portion 111. The major portion 110 gathers into a folded 107 and stored position 42 against the building wall 8. The upwardly extending portion 111 of the panel 101 bends at its lower end 113 around the bottom 58 of the canopy sides 57. The length or height of the upward extending portion 111 is sized so the lower panel assembly 100 does not interfering with the range of motion of the leveler 30. In the illustrated embodiment, the major portion 110 has a length of about seventy inches (70") and the upward portion 111 has a length of about twenty inches (20"). The upwardly extending portion 111 remains in its generally vertically extending orientation and does not fold up, but is free to pivot about its lower end 113 between a compact position 115 when the shelter 40 is stored 42 and a slightly forwardly angled position 116 when the shelter is extended 43 and the outermost air bag 62 is inflated as best shown in FIGS. 10-11. The rear end 102 of the panel 101 has several spaced grommets 119. The grommets 119 mate with cooperating washers and concrete screw fasteners to tautly and fixedly secure the panel rear end 102 to the building wall 8. The upper end 112 of the vertical portion 111 (panel end 102) forms a hemmed loop to receive the front support 130. The major 110 and forward 111 panel portions can be a single integral sheet, or two separate sheets joined by a fastener (such as a Velcro strip) extending along the width of the lower end 113 of the forward panel portion and the front end of the major portion 110.

The sides 104 of the panel 101 are secured to the bottom 58 of the canopy 50. The securement is preferably via releasable fasteners, such as with fastener strips 121 extending along the panel sides 104. The fastening strips 121 extend along the major panel portion 110. The fastener strips 121 have a first hooking portion 122 and a second releasable fabric portion 123, such as a Velcro strip. One strip portion 122 is firmly secured to the top 108 of each panel side 104. The second mating strip portion 123 is firmly secured to and extends along the bottom 58 of the side portions 57 of the canopy 50. The strips portions 122 and 123 are in aligned registry to matingly secure the panel sides 104 to the bottom 58 of the canopy sides 57. When the canopy 50 and lower panel assembly 100 are extended 43, the major panel portion 110 is in taut, generally horizontal, and in planar alignment with the bottom 58 of the canopy 50. The flexible strips 121 on the major portion 110 allow it to gather into the folded condition 107 when the canopy 50 and panel assembly 100 retract 42.

Lateral supports 125 support the middle of the major portion 110 as best shown in FIGS. 6, 7 and 12. The lateral supports 125 are metal pipes or rods that do not sag significantly when supported at their ends. The supports 125 are preferably secured to the panel 101 via hemmed laterally extending loops 126 formed into the panel at uniformly spaced locations about every fifteen inches (15") along the length of the major panel portion 110. Each loop 122 extends from one side 104 of the panel 101 to the other 104 and snuggly receive one support rod 125.

The front support assembly 130 includes a lateral front support 131, such as two inch diameter PVC tubing. The PVC tubing 131 has a length equal to the width of the panel 101. The ends 132 of the tube 131 are flush with the panel sides 104. Each PVC tube end 132 receives a metal pipe insert 133. One end of each insert 133 is inserted into each end 132 of the PVC tube 131. The extending portion 134 of each opposed insert 133 has a fastener 135 such as an eyebolt. The extending portions 134 space the eyebolts 135 about four inches from their panel side 104 and aligns the eyebolts with the side frame beams 84 and 85.

A pair of flexible supports 136 secure the ends of the lateral front support 131 to the sides of the frame 81. The flexible supports 136 are preferably equal length chains. One end of each chain 136 is secured to a frame hook 88, and the other end of the chain is secured to the eye bolt 135 of front support 131. The hooks 88, eyebolts 135 and chains 136 are in planar alignment with their corresponding frame beam 84 or 85. The chains 136 allow the front portion 110 of the panel 101 to pivot between its compact position 115 when the deflated canopy 50 and its panel 101 are stored 42, and its forward extended position 116 when the inflated canopy and panel are extended 43. A cushion pad 137 is wrapped around the front support 131 to help prevent damage to the panel 101 during operation. One or more clamps 139 hold the cushioning pad 137 in place. The total diameter of the front support assembly 130 is about three and a half inches (3.5"). In another embodiment (not shown), the front support assembly 130 can take the form of a metal pipe extending the width of the frame 81 in place of the PVC tube 131, inserts 131 and a flatbar tension member.

Operation of the Rail Shelter

Although the operation of the rail shelter 40 should be readily understood based on the above, the following is provided for the convenience of the reader. When the loading bay 6 is not in use, the leveler 30 is stored in its upright position 32 with its lip 35 retracted 36 and the bay door closed. The deflated canopy 50 and retracted support frame 80 are stored 42 against the building wall 8 as in FIGS. 1, 3 and 9. The frame 81 hangs vertically pendant from the pivot support 91, and pulls back the deflated canopy 50 via straps 65 to hold the canopy 50 against the building wall 8. The rigid frame 81 supports, shapes and holds the front end 52 of the otherwise floppy canopy 50 against the wall 8. The lower panel assembly 100 is retracted 42 in a folded manner 107 against the building wall 8. The rigid frame 81 also supports and holds front support assembly 130 and the folded 107 panel 101 against the wall 8.

A boxcar 20 is located adjacent the loading bay 6 so that its doorway 25 is in aligned registry with the building doorway 7 and leveler 30 during loading and unloading operations as in FIG. 2. The loading bay door is raised and the shelter blower motor 75 is activated. As the canopy 50 inflates, its outer end 52 extends toward the railcar 20. The expanding canopy 50 pulls the rigid frame 81 forward via straps 65 as in FIG. 4. While the canopy 50 expands, the frame 81 continues to support and shape its front end 52, and the pivoting support mechanism 91 carries and guides the forward movement of the frame 81 along a path of travel 99. As the canopy 50 extends and the frame 81 moves forward, they carry the lower panel assembly 100 and its front panel support assembly 130 forward with them. The canopy 50 continues inflating and extending until its outer end 52 engages and presses against the boxcar sidewall surface 23, which can include the front surface of the opened sliding door 24, as in FIG. 6. The front surface 68 of the outermost airbag 62 engages and forms a continuous seal 70 around the sides 26a and top 26b of the boxcar doorway 25. The front end 103 of the lower panel assembly 100 is positioned near the railcar chassis below the threshold 26c of the doorway 25.

The leveler 30 is lowered 33 and its lip 35 is fully extended 37 to engage and rest on the boxcar floor 27. For wider boxcars 20, the lip 35 can be partially retracted 38 as shown in FIG. 8 to facilitate end loaded cargo in the railcar 20, 20b. For narrower boxcars 20a, the fully extended 37 lip 35 extends at least four inches (4") into the railcar as in FIG. 7. Cargo is then brought from the loading bay 6, over the leveler 30, through the boxcar doorway 25 and placed on the boxcar floor 27, or visa versa.

When loading and unloading operations are done, the blower motor 75 is turned off. As the extended 43 canopy 50 deflates, the weight of the canopy support 80 biases it back along its path of travel 99 toward the building wall 8. This passive retraction of the support 80 pushes the canopy 50 back against the wall 8. When the shelter 40 retracts 42, the support assembly 80 once again holds the canopy 50 and lower panel assembly 100 against the wall 8.

While the invention has been described with reference to a preferred embodiment, it will be understood by those skilled in the art that various changes may be made and equivalents may be substituted without departing from the broader aspects of the invention. For example, the inflatable canopy 50 can have a variety of configurations when inflated, and can have four inflatable sided, including an inflatable bottom side. The size and shape of the air bags 53 can be individually or collectively increased or decreased, or to ensure a proper seal 70 given the variety of rail car 20 configurations. The rigid frame 81 can be secured between the second 63 and third 64 airbags. The canopy 50 and its bottom panel 101 can be fabricated with various types of suitable materials such as vinyl with differing weights and specifications, or other fabric. Reduced or increased scale versions of the rail shelter are covered by the broad scope of this design. The loading dock building can include a fixed structure around the bay opening when the bay opening is too far from the tracks. The present invention is then mounted around the opening of that fixed structure. While the present invention is described with reference to a railroad car or boxcar 20, it should be understood that various types of transport devices, such as trucks, ships, airplanes, passenger trains, etc., can be substituted without departing from the broader aspects of the invention.

We claim:

1. A loading dock rail shelter for a building having a building wall with a bay doorway, the bay doorway having top and side portions, the bay doorway being spaced from railroad tracks for a railcar, the railcar having a sidewall with a railcar doorway, the railcar doorway being selectively aligned with the bay doorway, and said loading dock rail shelter comprising:

an inflatable canopy with fixed and extendable canopy ends, top and side canopy portions, a canopy perimeter and an open canopy interior, said fixed canopy end being fixedly secured to the building wall around the bay doorway, said inflatable canopy being movable between retracted and extended canopy positions;

canopy fasteners secured along said top and side canopy portions, said canopy fasteners extending outwardly from said canopy perimeter proximal to and inwardly from said extendable canopy end;

a retractable canopy support structure with a frame and pivoting support mechanism, said frame having top and side frame portions and an open frame interior, said open frame interior receiving said canopy, said canopy fasteners being held by said frame, said pivoting support mechanism having pivotally secured and swinging ends, said pivotally secured end being pivotally secured to the building wall above said canopy, said swinging end being secured to said frame; said frame and pivoting support mechanism being selectively movable between retracted and extended frame positions, and said frame traveling with said canopy as said canopy moves between said retracted and extended canopy positions; and, wherein said frame holds and supports said outer canopy end as said canopy moves between said retracted and extended canopy positions, said outer canopy end engages and seals around the railcar doorway when in said extended canopy position, and said frame passively retracts and holds said canopy against the building wall when in said retracted frame position.

2. The loading dock rail shelter of claim 1, and wherein the railroad tracks and building have a ground surface between them, and wherein each of said side canopy portions have a bottom end, and said frame holds said canopy with its said bottom ends above the ground surface as said canopy moves between said retracted and extended canopy positions.

3. The loading dock rail shelter of claim 2, and wherein said frame is at a lower height when in said retracted frame position, swings up to an elevated height when in said extended frame position and swings down to said lower height as said frame moves toward said retracted frame position.

4. The loading dock rail shelter of claim 3, and wherein said frame is biased towards said retracted frame position and pulls said canopy toward said retracted canopy position.

5. The loading dock rail shelter of claim 1, and wherein the building and railcar walls are in generally parallel vertical alignment, and said frame is supported by said pivoting support mechanism in generally parallel vertical alignment with the building and railcar walls when in said retracted and extended frame positions.

6. The loading dock rail shelter of claim 1, and wherein said pivoting mechanism includes first and second sets of upper and lower pivot rods, each of said upper and lower pivot rods being of equal length, and each of said upper and lower pivot rods has said pivotally secured and swinging ends.

7. The loading dock rail shelter of claim 6, and wherein said upper and lower pivot rods of each said set of upper and lower pivot rods are in overlapping planar alignment and form a rearward stop to prevent further rearward retraction of said frame.

8. The loading dock rail shelter of claim 7, and wherein said upper pivot rods lay flush against said lower pivot rods when in said retracted frame position to form said rearward stop, said stop spacing said frame from the building wall to accommodate said canopy.

9. The loading dock rail shelter of claim 6, and wherein said frame has a frame perimeter with a rectangular shape formed by a top, first and second side and bottom frame beams, said frame beams being joined and in planar alignment.

10. The loading dock rail shelter of claim 9, and wherein said side frame beams are in planar alignment with said pivot rods.

11. The loading dock rail shelter of claim 10, and wherein said canopy fasteners are looped straps extending at uniformly spaced locations along said top and side canopy portions and extend inwardly from said frame perimeter.

12. The loading dock rail shelter of claim 11, and wherein said top and side canopy portions form an inverted U-shaped cross-sectional configuration when said canopy is inflated to said extended canopy position, and said frame and canopy fasteners hold said outer canopy end in said inverted U-shaped cross-sectional configuration as said canopy moves between said retracted and extended canopy positions and when said canopy is in said retracted canopy position.

13. The loading dock rail shelter of claim 1, and further comprising a canopy mounting structure anchored to the building wall around the top and side portions of the bay doorway, and a pivot mounting structure with an upper mounting portion anchored to the building wall, said upper mounting portion being above the canopy mounting structure, said fixed canopy end being fixedly secured to said canopy mounting structure, and said pivotally secured ends of said pivoting support mechanism being fixedly secured to said upper mounting portion.

14. The loading dock rail shelter of claim 1, and wherein said canopy is formed by a series of connected airbags joined together at hemmed joints, said series of connected airbags including a rear air bag fixed to the building wall, an outermost airbag at said outer canopy end and an adjacent airbag adjacent to said outermost airbag, said canopy fasteners extending from said hemmed joint between said outermost and adjacent airbags.

15. The loading dock rail shelter of claim 2, and wherein said inflatable canopy includes a bottom canopy portion spanning between said bottom ends of said side canopy portions, said bottom canopy portion having fixed and extendable ends and being movable between retracted and extended panel positions, said bottom canopy portion closing the opening between said side canopy side portions when said canopy is in said extended panel position.

16. The loading dock rail shelter of claim 15, and wherein said bottom canopy portion is formed by a lower panel assembly having a sheet of material with front, rear and side panel ends, said rear panel end being anchored to the building wall below the bay opening, and said side panel ends being secured along said bottom ends of said side canopy portions, and said front panel end extends with said extendable canopy end.

17. The loading dock rail shelter of claim 16, and wherein said sheet of material includes major and minor portions, said major portion extending from said rear canopy end to said extendable canopy end when in said extended canopy position, said minor portion extending upwardly from and along said extendable canopy end, said major portion having lateral supports extending between said panel sides.

18. The loading dock rail shelter of claim 17, and wherein the railcar includes one of either a chassis or doorway threshold, and said minor portion engages and seals against one of either the railcar chassis or threshold when said canopy is in said extended canopy position, said canopy forming a 360 degree seal around the railcar doorway.

19. The loading dock rail shelter of claim 17, and wherein said minor portion is in close proximity to one of either the chassis or doorway threshold when said canopy is in said extended canopy position.

20. The loading dock rail shelter of claim 17, and wherein said frame and canopy fasteners hold said canopy and lower panel assembly in a generally uniformly compacted arrangement when in said retracted canopy position.

21. The loading dock rail shelter of claim 17, and wherein and wherein said lower panel assembly includes a front support assembly holding and supporting said front panel end.

22. The loading dock rail shelter of claim 21, and wherein said front support assembly and said minor panel portion pivot between an extended position when said canopy is in said extended canopy position and a compacted position when said canopy is in said retracted canopy position.

23. The loading dock rail shelter of claim 22, and wherein said front support assembly includes first and second chains, each said chain having opposed ends, one end of each said chain being secured to an end of said front support assembly and one end of each said chain being secured to said frame.

24. The loading dock rail shelter of claim 1, and wherein the building is equipped with a dock leveler with a deck and an extendable lip, the deck being selectively raised and lowered and the lip being selectively extended and retracted, said deck having a rear end pivotally secured to the building and a forward end extending outward from the building proximal the railcar doorway when lowered, and the lip engaging and resting on the railcar floor when the deck is lowered and the lip is extended, said top and side canopy portions extending around the dock leveler when extended.

25. The loading dock rail shelter of claim 24, and wherein the dock leveler has leveler sides spaced from said side canopy portions when the deck is lowered, and wherein side openings are formed between the leveler sides and said side canopy portions when the deck is lowered, and wherein said canopy includes a bottom canopy portion spanning between said bottom ends of said side canopy portions, said bottom canopy portion having fixed and extendable ends and being movable between retracted and extended panel positions, said bottom canopy portion being positioned under the deck when the deck is lowered, and said bottom canopy portion closes the side openings when said canopy is in said extended canopy position.

26. The loading dock rail shelter of claim 25, and wherein said mounting structure is positioned on the wall of the building around the top, sides and bottom of the bay doorway, and wherein said bottom canopy portion is formed by a lower panel assembly having a thin sheet of material with front, rear and side ends, said rear end being anchored to said mounting structure below the bay opening and dock leveler, said side ends are secured along said bottom ends of said side canopy portions, and said front end extends with said extendable end of said canopy.

* * * * *